April 10, 1934.                C. H. HARDING                1,954,567
                          PACKAGING SADDLE FOR GLASS
                              Filed Sept. 1, 1933
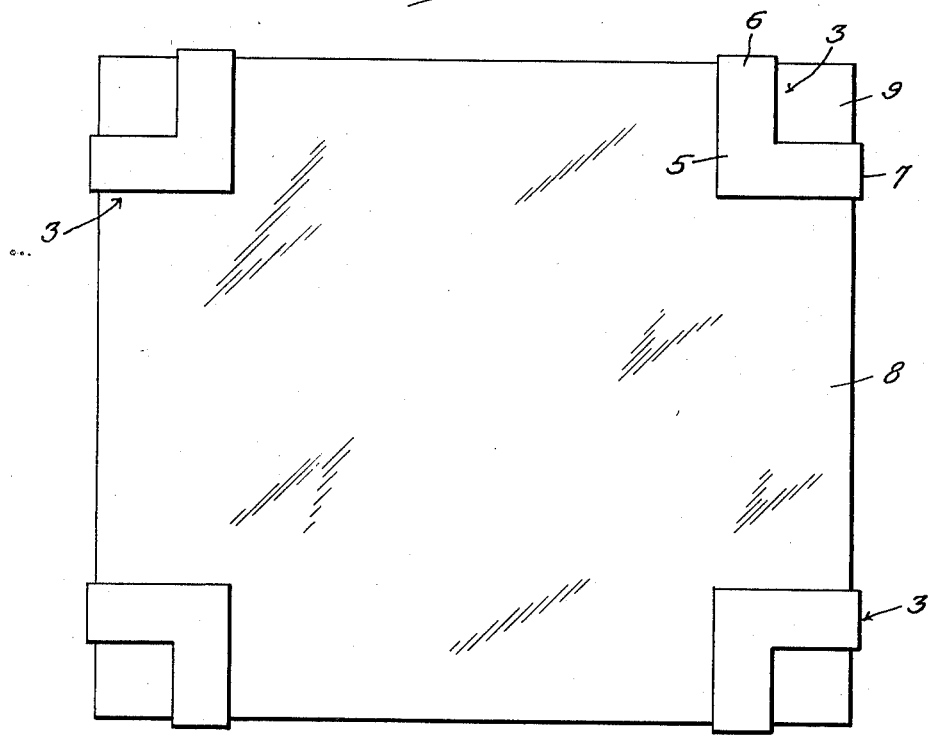
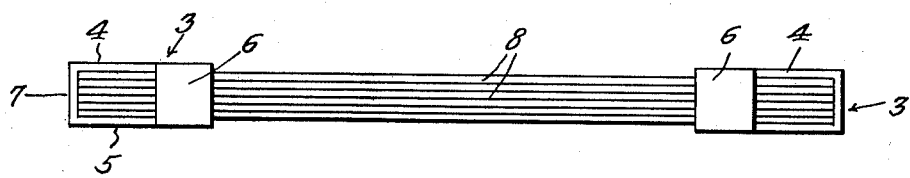
Inventor
Charles H. Harding,
By Clarence A. O'Brien
Attorney Patented Apr. 10, 1934

1,954,567

UNITED STATES PATENT OFFICE 1,954,567

PACKAGING SADDLE FOR GLASS

Charles H. Harding, Fort Smith, Ark.

Application September 1, 1933, Serial No. 687,876

1 Claim. (Cl. 206—62)

This invention relates to a unique accessory for use in the glass industry primarily adapted to facilitate assembling and packaging of sheet glass and the like and it has more particular reference to a simple and economical unit which may be aptly and briefly referred to as a cushioning corner saddle.

Although there is no standard method followed in packing, crating and shipping of plate and sheet glass the method most used consists in packing and wrapping the glass plates and inserting these in straw or excelsior packed boxes and crates.

Under this plan when the crate is opened for removal of the glass, the place of deposit becomes littered with waste material constituting a fire hazard and a nuisance as to its expeditious disposal.

I have, therefore, discovered the need for the provision of suitable and practicable means such as may be saddled over the corners of the stack of lights and have perfected an ingenious article for satisfactorily accomplishing the purpose and permitting the glass to be packed safely, neatly and with a requisite degree of cleanliness in order to improve the purpose of packing, unpacking and repacking glass.

The device as designed in accordance with my idea expedites the initial packing operation and crating and permits the crate to be unpacked without the muss and disorder that naturally accompanies hay, excelsior and straw packed boxes.

The device may be justly endorsed by the trade in that it saves time and money for jobbers and dealers to unpack and repack in warehouses. When the cushioning saddles are properly placed shifting of the package of glass in the box is overcome. While in transit there is no danger of breakage, particularly of the corner portions which are so susceptible of breakage when hastily handled by incompetent hands.

Other features and advantages will become more readily apparent from the following description and drawing.

In the accompanying drawing wherein like numerals are employed to designate like parts throughout the views:—

Figure 1 is a top plan view of a stack of glass plate or sheets of glass with the four protective assembling and retaining corner saddles in place.

Figure 2 is an edge elevational view of the assembly shown in Figure 1.

Inasmuch as each device is the same in construction the description of one will suffice for all. The device as applied to the unit is illustrated at 3. It is preferably made from compressible, corrugated cardboard or equivalent stock. In side elevational view it may be said to be substantially L-shaped in configuration, observing it from either side. In fact it may be described as made up of a pair of spaced parallel companion right angular portions or sections 4 and 5 joined together in such relationship through the instrumentality of connective webs 6 and 7. Thus constructed the device is expansible and contractible to permit it to accommodate several or a multiplicity of sheets or plates of glass 8.

When the device is slipped over the corner portions of the glass plates it occupies the position shown in the drawing and it will be observed that the corner portions 9 are allowed to protrude or project in the exposed manner illustrated.

The urge for this change in the packing of window glass has come from the trade, who unpack it and who have found that the former packing of window glass in either long straw or soft hay creates too much litter in the room where it is unpacked, and which litter is not only a nuisance in volume but has to be destroyed by fire or sent to the dump heap.

I, therefore, have demonstrated that my so-called "saddle packing" meets every possible objection, since it is of very small size, and in this way affords the volume relief. In addition to this, I claim that my style of packing is not only unlike everything else but has the additional features of not covering the corners of the glass in its use. All handlers of glass, whether manufacturers or distributors, learned long ago that the most dangerous points on a light of glass for breakage are the corners, since they come to a sharp point. This packing is arranged so that the corners are left perfectly free and do not touch either the box or the carton packing. I also find that the packing done in this manner so that the pressure of the glass is perfectly free from all corners and goes over the glass in two ways is not only light and small but it does keep the glass suspended from the box itself, whether the box of glass is standing on its bottom or on its end.

My claim is, therefore, resolved into two primary results. First, the amount of cartons used in packing is much less in quantity than is now being used by any concern in the business, and in this way cuts the amount of so-called litter from the unpacking of the glass down to a minimum. Secondly, I claim that less breakage will occur from the use of this "saddle packing" than any other now in use due to the fact that the corners of the glass do not touch either the box or the carton packing.

A careful consideration of the foregoing description in conjunction with the illustrative drawing will enable the reader to obtain a clear understanding of the purpose, features and advantages, the explicit construction, and the invention as hereinafter claimed.

It is to be understood that minor changes in shape, size, relative proportions, and materials may be resorted to in practice without departing from the spirit of the invention or the scope of the invention as now claimed.

What is claimed is:—

As a new article of manufacture, a packaging and cushioning saddle of the class described comprising a pair of spaced parallel portions of general right angular form, and flexible connective webs joining corresponding end portions of said portions together in assembled relationship, the entire unit being constructed of cardboard or equivalent material to provide requisite flexible and cushioning properties.

CHARLES H. HARDING.